UNITED STATES PATENT OFFICE.

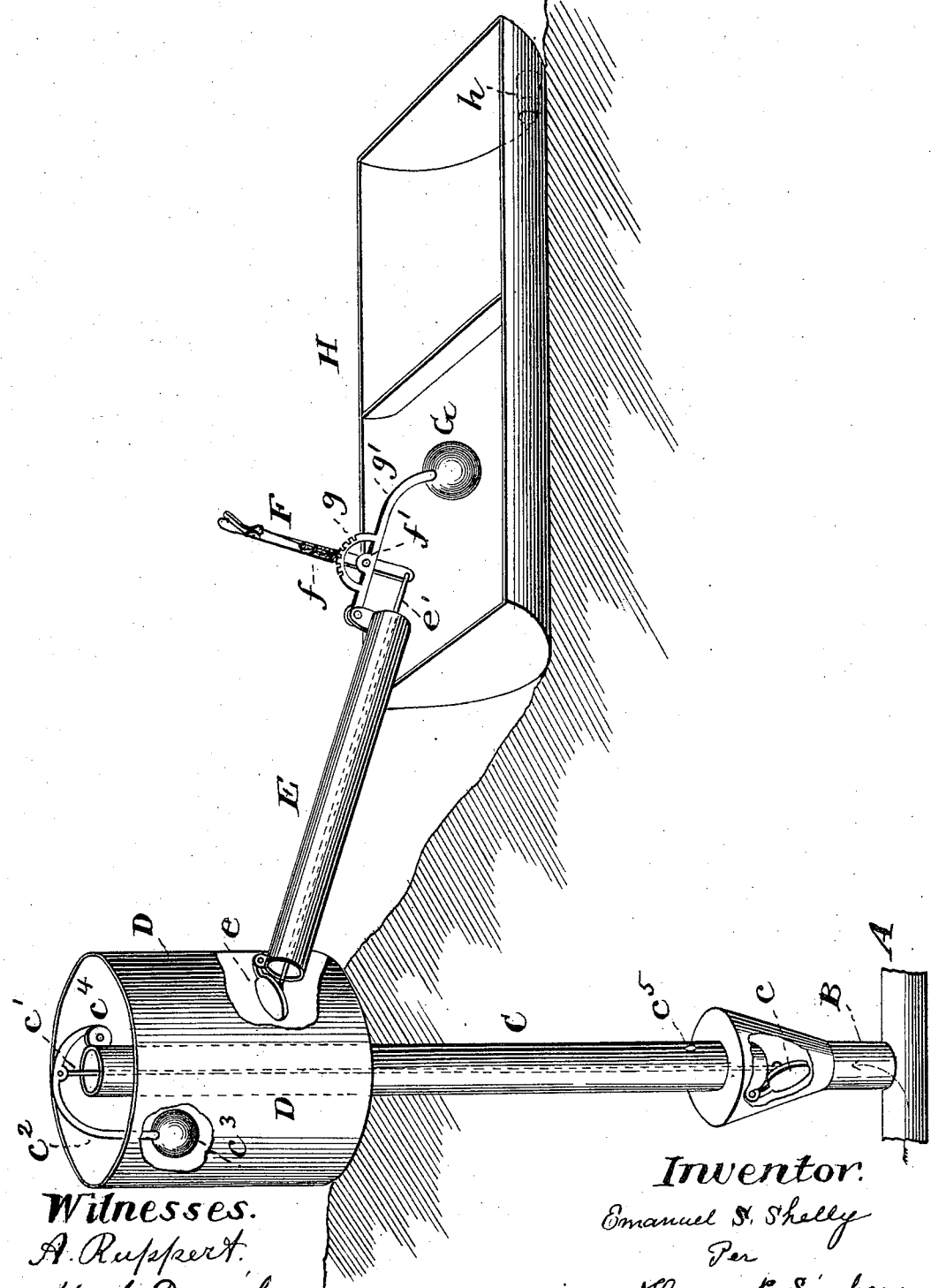

EMANUEL S. SHELLY, OF LA GRANGE, INDIANA, ASSIGNOR OF ONE-HALF TO SAMUEL SHELLY, OF SAME PLACE.

STOCK-WATERING APPARATUS.

SPECIFICATION forming part of Letters Patent No. 574,952, dated January 12, 1897.

Application filed January 7, 1896. Serial No. 574,646. (No model.)

*To all whom it may concern:*

Be it known that I, EMANUEL S. SHELLY, a citizen of the United States, residing at La Grange, in the county of La Grange and State of Indiana, have invented certain new and useful Improvements in Stock-Watering Apparatus; and I do declare the following to be a full, clear, and exact description of the invention, such as will enable others skilled in the art to which it appertains to make and use the same, reference being had to the accompanying drawing, and to the letters of reference marked thereon, which forms a part of this specification.

The invention relates to an apparatus for watering stock, and the special object is to prevent the water from freezing in the trough, pipes, or reservoir during winter; also, to furnish animals always with fresh water to drink, the same having not been exposed to the sun or allowed to become foul in any way whatsoever.

The drawing is a perspective view of my invention broken away to show certain parts.

In the drawing, A represents a pipe connecting with a superposed spring or other source of supply. B C are pipe-sections, of which the former joints with the pipe A and the latter connects pipe B with a reservoir D. On the lower end of the pipe C is a hinged stop-valve $c$, which is connected by an end-pivoted rod $c'$ with a curved lever $c^2$, the latter having a float $c^3$ on its free end, while its fulcrum is at the other end on a pipe-stud $c^4$. When the water rises to the intended height in the reservoir D, the valve $c$ is closed and no more can get in, and when the water sinks below this the valve opens to admit a new supply, the tank being thus prevented from overflowing.

In the reservoir D and at the upper end of the pipe E is arranged the stop-valve $e$, which is connected by an end-pivoted rod $e'$ with the lower end of a lever F, the latter being provided with a spring-pawl $f$ to work in the curved ratchet $g$ on the arm $g'$ of a float G. The lever F is fulcrumed on the float-arm $g'$ at $f'$ and may be fastened at any adjustment to hold open the valve $e$ to any degree desired.

When the water in trough H has reached the desired height, the lever has been so moved as to close the valve $e$ and shut off any further supply.

$c^5$ is a small outlet to facilitate the escape of any water remaining in pipe C to prevent it from being frozen, while all water in the reservoir D may be let out by opening valve $e$ into the trough, which has a bottom plug $h$ to allow its escape therefrom. Thus it will be perceived that no water need freeze in trough, pipes, or reservoir, while a supply of fresh water may be always drawn for the stock at any time.

I claim—

In a stock-watering apparatus, the combination of a tank or reservoir, a drinking-trough, a float-lever, an arc-rack on the float-lever, a hand-lever with spring-pawl, a discharge-pipe, a valve-rod in said pipe and a valve hinged to one end of said pipe, all connected and arranged substantially as shown and described.

In testimony whereof I affix my signature in presence of two witnesses.

EMANUEL S. SHELLY.

Witnesses:
J. F. CLUGSTON,
J. E. McCLASKEY.